United States Patent [19]

Schulze et al.

[11] 3,996,452
[45] Dec. 7, 1976

[54] METHOD FOR OPTIMIZING A CONTROLLED SYSTEM PARAMETER

[75] Inventors: Holger Schulze; Hans Löffler, both of Erlangen, Germany

[73] Assignee: Siemens Aktiengesellschaft, Munich, Germany

[22] Filed: Aug. 21, 1975

[21] Appl. No.: 606,428

[30] Foreign Application Priority Data

Aug. 22, 1974 Germany .......................... 2440346

[52] U.S. Cl. ............................... 235/150.1; 241/34
[51] Int. Cl.² ................... B02C 25/00; G05B 13/00
[58] Field of Search .................... 235/150.1; 241/34

[56] References Cited

UNITED STATES PATENTS 3,044,701   7/1962   Kerstukos .................... 235/150.1

Primary Examiner—Eugene G. Botz
Attorney, Agent, or Firm—Kenyon & Kenyon Reilly Carr & Chapin

[57] ABSTRACT

A controlled system parameter is optimized by providing at periodic time intervals discrete adjustment steps derived from the difference, with alternating sign, between a constant component and a component which depends on the change of the control system parameter caused by the preceding adjustment step. An application of the method to a ball mill in a cement plant for optimizing its efficiency is shown.

10 Claims, 7 Drawing Figures

METHOD FOR OPTIMIZING A CONTROLLED SYSTEM PARAMETER

BACKGROUND OF THE INVENTION

The present invention relates to control systems in general and more particularly to an improved method for optimizing a controlled system parameter to obtain a maximum efficiency.

Methods of this general nature are known in the art. For example, one such method is described in the book "Statistical Analysis of Linear Control Systems" by W. Leonhard, 1973, pages 99 to 106. This known method superimposes a constant continuous test signal of smaller amplitude on the regulated variable. It performs a cross correlation of the test signal with the control system parameter which is to be optimized and uses the result of the correlation to drive an integrating control which then changes the regulated variable in a direction so as to cause the result of the correlation to become zero. The frequency of the test signal must be adapted to the time scale of the controlled signal. However, the formation of a mean necessary for performing the correlation must extend over a multiple of the period of the test signal. Because of this the prior art method for finding the optimum operating point is relative slow. In particular where the method is used in a controlled system having large time constants in its transfer function and rapid changes in its optimum operating point, as compared to that time constant, the objective of the system will not be reached.

In view of this, the need for an improved system of this general nature becomes evident.

SUMMARY OF THE INVENTION

The present invention solves this problem. It provides a method of optimizing which reaches its optimum point rapidly in comparison to the prior system. In accordance with the present invention such is accomplished by having the control system acted upon in a step wise manner by at least one regulated or controlled variable. Periodically successive adjustment steps are provided which are derived from the difference, with an alternating sign, between a constant component the component which depends on the change of the controlled system parameter caused by the preceding adjustment step.

In accordance with a further feature of the present invention, a component of the adjustment which depends on the controlled system parameter change is limited to a value which is smaller than the constant component of the adjustment stop. As a result, adjustment steps following each other in time always take place basically in opposite directions. Since the adjustment steps leading toward the optimum point turn out to be larger than the adjustment steps leading away from the optimum, a substantially smaller test step is taken after each successful step in the opposite direction. As a result, in essence, a double confirmation is obtained indicating that movement is in the proper direction. This embodiment of the invention reduces overshooting of the desired optimum to a minimum.

As a preferred example of the application of the present invention its use for bringing about an operational optimization of a ball mill such as those used in cement manufacture is illustrated. In the illustrated example, the controlled system parameter which is being optimized is the quantity of finished material referred to energy consumption of the mill motor. The regulated variable is the degree of admission of raw material. In accordance with the illustrated example, it is also advantageous to use, as a further controlled variable in reaching optimization, the drive speed of the mill motor. Where both the quantity of raw material and the speed of the of the mill motor are controlled it is advisable that the adjustment step controlling the admission of raw material be smaller by approximately one half than the period of the adjustment steps used to the change the drive speed of the mill motor to avoid interaction between the two variables.

DETAILED DESCRIPTION OF THE PREFERRED EMBODIMENT

Figure 1:
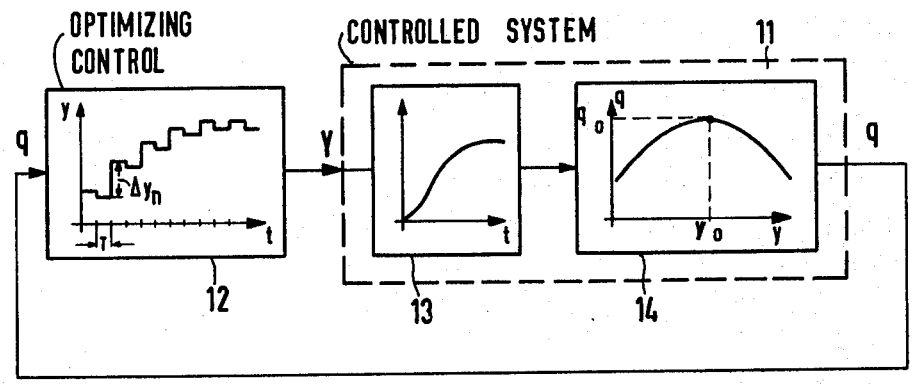
FIG. 1 is a basic block diagram helpful in understanding the method according to the present invention.

FIG. 1 is a general, overall block diagram of the system according to the present invention. In this diagram a controlled system, i.e. the system to be acted upon, is designated as 11. The optimizing control of the present invention is designated 12. The transfer characteristics of the control system are assumed to be represented by a linear portion designated by the block 13 having a low pass action and an undelayed non-linear part designated by block 14. As illustrated by block 14 the output variable $q$ of this portion is assumed to have an approximately parabolic shape in the vicinity of the optimum point $Y_o/q_o$ as a function of its input variable $y$. The control system parameter $q$, is provided as the input variable to the optimizing control 12. The optimizing control 12 delivers, at fixed time intervals T, periodic adjustments $\Delta Y_n$ to the control system 11. The amplitude of the steps $\Delta Y_n$ which alternate in a positive and negative direction changes until the optimum operating point is reached from which point the steps remain constant so that $y$ alternates back and forth about the optimum point.

Figure 2:
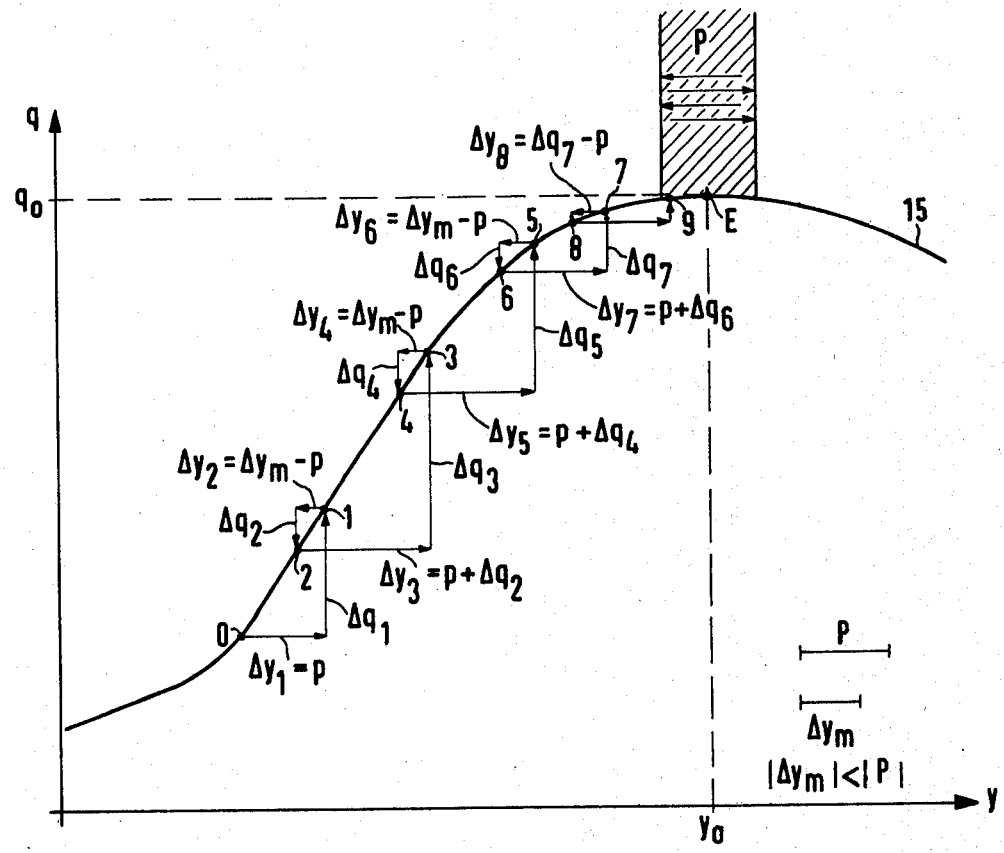
FIG. 2 is a curve illustrating the operation of a controlled system and the application thereto of the adjustment steps of the present invention.

A curve illustrating the operation of the method of the present invention is shown on FIG. 2. The curve 15 represents the static dependence of the control system parameter on the regulated quantity $y$ provided to the input of the controlled system. In other words, it corresponds essentially to the function shown in block 14 of FIG. 1. At the point E having the coordinates $Y_o$, $q_o$ the controlled system parameter $q$ reaches a maximum value which is assumed to represent a optimum. The purpose of the method of the present invention is to get at or near the optimum value E automatically using discrete adjustment steps starting from point O. This is accomplished by successive adjustment steps for which the following relation holds:

$$\Delta Y_n = (k \cdot \Delta q_n - p) \cdot (-1)^{n-1} \qquad 1.$$

where $k$ is a constant factor; and $$\Delta q_n = q_{n-1} - q_n \qquad 2.$$

is the change of the controlled system parameter $q$ caused by the preceding adjustment step. The variable new adjustment step component is $k \cdot \Delta q_n$ and $p$ is the constant adjustment step component.

FIG. 2 illustrates the variation of the optimizing method according to the present invention in which the variable adjustment step component depending on the change of the controlled system parameter is limited to a constant value $\Delta Y_m$, which it cannot exceed. This value is smaller than the constant adjustments step component $p$. In the illustrated example, the ratio of the value $\Delta Y_m$ to $p$ is $\Delta Y_m/p = \frac{1}{3}$. In describing the example shown on the figure, K will be assumed to be 1. Starting with the point 0 and using equations 1 and 2 above it can be seen that for the first step $\Delta Y_1 = p$. This results in a change $\Delta q_1$ of the controlled system parameter $q$ leading to point 1. This change of the controlled system parameter $q$ is larger than the limit $\Delta Y_m$. Thus, starting from the point 1 an adjustment step of the magnetude $\Delta Y_2 = \Delta Y_m - p$ takes place. Because of the last term in equation (1) this now takes place in the opposite direction. As a result, point 2 is reached. Thereupon an adjustment step $\Delta Y_3 = \Delta q_2 + p$ takes place in the positive direction again. In other words, it takes place in the direction leading to the optimum. The process continues in corresponding steps in this manner until point 7 is reached. In this region the curve 15 is so flat that the change of the controlled system parameter in the positive direction, $\Delta q_7$ for the first time falls below the limit $\Delta Y_m$. Thus, the adjustment step leading to point 8 has the magnitude $\Delta Y_8 = \Delta q_7 - p$. This continues in the same manner until there is no longer a change of the controlled system parameter $q$ in two successive adjustment steps. Then, adjustment steps of the magnitude $p$ alternately of opposite direction about the point E take place. The end point or optimization point of the control has now been reached.

Were the system operated without limiting the adjustment component dependent on the change of the controlled system parameter, i.e. its limitation to $\Delta Y_m$ nothing would be changed in the above described procedure in the flat part of the curve 15. i.e. in the vicinity of the optimum. However, in the steeper portion of the curve, the individual adjustment steps are subject to larger variations. Depending on the shape of the non-linear function 15, the method without unlimited adjustment step components can lead to a smaller number of steps to reach the optimum. However, there is a basic danger when operating in this manner of overshooting the maximum value E because of the greater curvature of curve 15 in the region of that value. In some cases, unstable behavior may even occur. Thus, this variation of the method using unlimited adjustment step components should be used only where the shape and change of the optimizing function are largely known.

Figure 3:
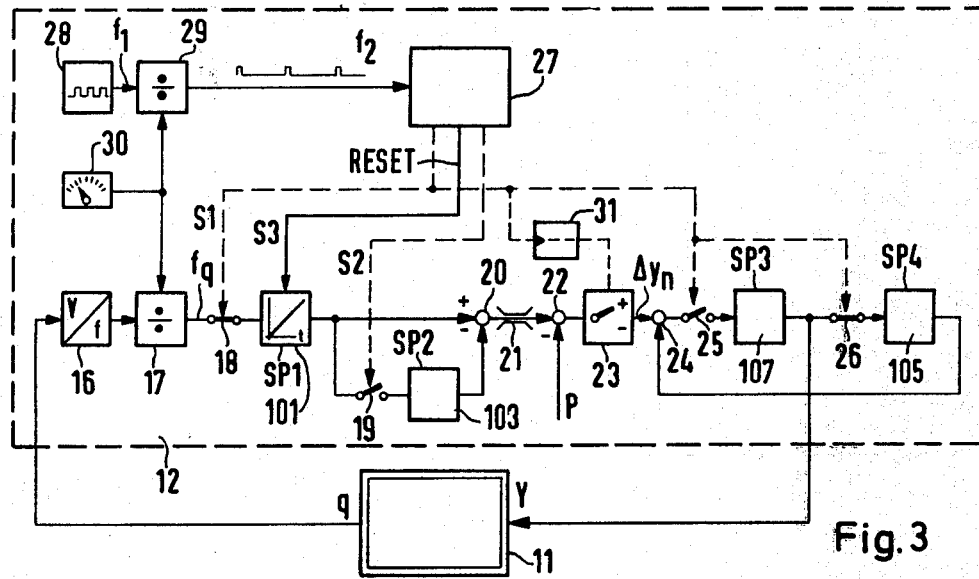
FIG. 3 is a block-schematic diagram of apparatus for carrying out the method of the present invention.

A block diagram of a system for implementing the method disclosed in connection with FIGS. 1 and 2 is shown on FIG. 3. A more detailed circuit diagram for this implementation will be described below in connection with FIG. 6. The parameter of the controlled system 11 which is to be optimized is provided as an input to a voltage to frequency converter 16 at the input of the optimizing control 12. This converts the input into a pulse train having a frequency proportional to the value of the controlled system parameter $q$. The pulse train is stepped down in frequency using a conventional divider 17. The output of the divider 17 is coupled through a switch 18 to a first storage means 101 which can be a digital counter. The switch 18 is operated in response to a signal designated S1. Counter or storage means 101 also has a reset input coupled to a signal S3 which resets it to 0. Once reset it is then enabled to receive pulses $S_q$ from the divider 17 through the switch 18. Such enabling, through control of switch 18 is carried out for fixed constant times. The output of the storage means 101 can be transferred to a second storage means 103 through another switch 19 responsive to a control signal S2. Also shown is a summing junction 20 at which the contents of the two storage means 101 and 103 can be differenced. With reference back to equation (2) it can be seen that the output of this summing junction 20 will represent the quantity $\Delta q_n$ if, within means 101 is stored the quantity $q_n$ and in 103 the quantity $q_{n-1}$. Shown schematically is a limiting device 21 which limits this output, to the value $\Delta Y_m$ in the manner described above. The output of the limiting means is differenced with the fixed value $p$ at the summing junction 22. This in effect carries out the computation of the first quantity in brackets of equation (1) above. The output of summing junction 22 is provided as an input to a polarity reversing device 23 which alternately reverses the polarity of its output in response to a control input. Thus, appearing at the output is the adjustment step $\Delta Y_n$. At the summing junction 24, this step is added to the previous value of $y$ which was stored in storage means 105. This sum is then coupled through a switch 25 to storage means 107 from the output of which the control quantity $y$ i.e. the regulated or controlled variable, is provided to the controlled system 11. The loading, reloading and clearly of the storage means 101, 103 and 107 along with the operation of the polarity reversing device 23 are controlled by the control pulses S1, S2 and S3 provided by a control unit 27. In general terms, control unit 27 comprises a stepping device which is advanced by input pulses at frequency $f2$ and which appear at a fixed time scale. The input pulses are generated by a clock 28 operating at constant frequency $f1$ followed by a controllable pulse divider 29. The frequency $f2$ determines the time spacing of the sequentially delivered adjustment steps $\Delta Y_n$. This spacing must be adapted to the time response of the controlled system or to existing operating conditions. As a result, means are provided to adjust the division ratio of divider 29. Shown is a manually setable operating device 30 as an example. This permits setting the divider ratio to vary the frequency of the pulse train $f2$. It is essential that the divider 17 be changed at the same time. Since as a greater space between pulses in the pulse train $f2$ occurs, there will be a greater number of pulses out of the voltage to frequency 16 for a given step. Thus, were they not divided down, the storage means 101 could overflow within a time period. Alternatively, if the system were designed to accommodate the longest time period, the full capability of the storage means 101 would not be used and resolution would be lost. Thus, both dividers 29 and 17 are set together to at all time use the full capacity of the storage means 101. The operation of the system by means of the closing and opening of the various and switches and resetting of counters, etc., will now be described. Initially the switch 18 is closed in response to the signal S1 and the voltage representing the quantity $q$ is converted into a pulse train which is loaded into storage means 101. After a predetermined time period switch 18 is opened. The storage means 101 now contains a value corresponding to a value of $q$. Switch 18 is arranged so that it is closed in the absence of the control signal S1 and opened in response thereto. Switch 26 operates in the same manner. Thus, the value which was previously in storage means 107 was at the same time being transferred to storage means 105. The signal S1 appears opening switches 18 and 26 and closing switch 25. At the summing junction 20, the value in storage means 101 which, in terms of equation (2) is $q_n$ is subtracted from the value stored in storage means 103 which is $q_{n-1}$. This difference, $\Delta q_n$ is limited through the limiter 21 and then differenced with the fixed value $p$ after which it passes through the reversing switch 23 to the summing junction 24. Here it is summed with the previous value of $y$ which is stored in storage means 105 and provided through the switch 25 as a new input to storage means 107. The value in storage means 107 is now the old value $y$ plus $\Delta Y_n$. This output is then provided as the new control variable $Y$ to the controlled system 11. Once the new value reaches the storage means 107, switch 25 is opened and switch 19 closed in response to the signal S2. The value in storage means 101 is now transferred to storage means 103. The switch 19 is opened and the reset signal S3 used to reset the storage means 101. The switches 18 and 26 are then closed and the cycle begins over again. The cycle continues in the same manner except that, upon the appearance of S1, the polarity reversing means 23 is actuated through a flip-flop 31 to cause the polarity of the output signal of the summing junction to be reversed at the output of the polarity reversing means 23 to result in a polarity opposite from the preceeding cycle.

Figure 4:
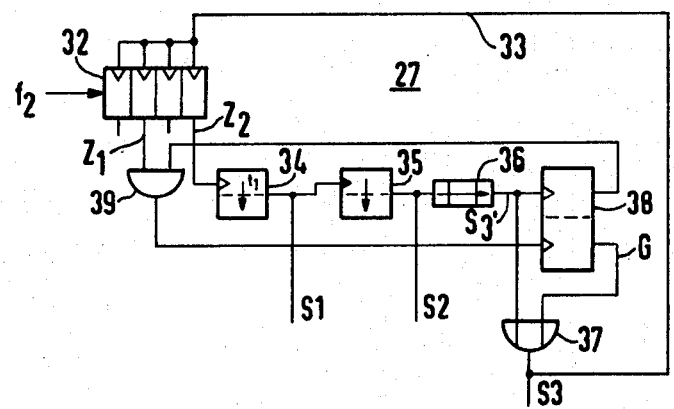
FIG. 4 is a logic diagram illustrating a timing means which can be used in the arrangement of FIG. 3.

FIG. 4 is a logic diagram illustrating an embodiment of the control unit 27 of the FIG. 3. It includes a digital counter 32 having at its input a pulse train $f_2$. As shown, the counter is a four-stage binary counter with each of the stages reset by an input on line 33. This input is the signal S3. The most significant bit of the counter is coupled as the input to a monostable multivibrator 34 having an unstable time $t1$. The time $t1$ must be sufficiently long to permit the previous regulated variable value and the new adjustment step $\Delta Y_n$ to be fed into the storage means 107. Note that it is the output of this monostable which closes the switch 25 and opens the switches 18 and 26 in addition to carrying out the switching of the reversing means 23. The trailing edge of the pulse output by the monostable 34 is used to trigger a second monostable 35. This has a comparatively short unstable time and is used to provide signal S2. As illustrated on FIG. 3 the output S2 is used for transferring the contents of the storage means 101 to the storage means 103. This output is also used, after delay through a delay member 36, as one input to a flip-flop and one input to an OR gate 37. The second input to the flip-flop 38 is coupled to the output of an AND gate 39 having as one input the second bit of the counter 32 and as a second input the set output of the flip-flop 38. The second or reset output of the flip-flop 38 is coupled as a second input to the OR gate 37, the output of which is the signal S3.

Figure 5:
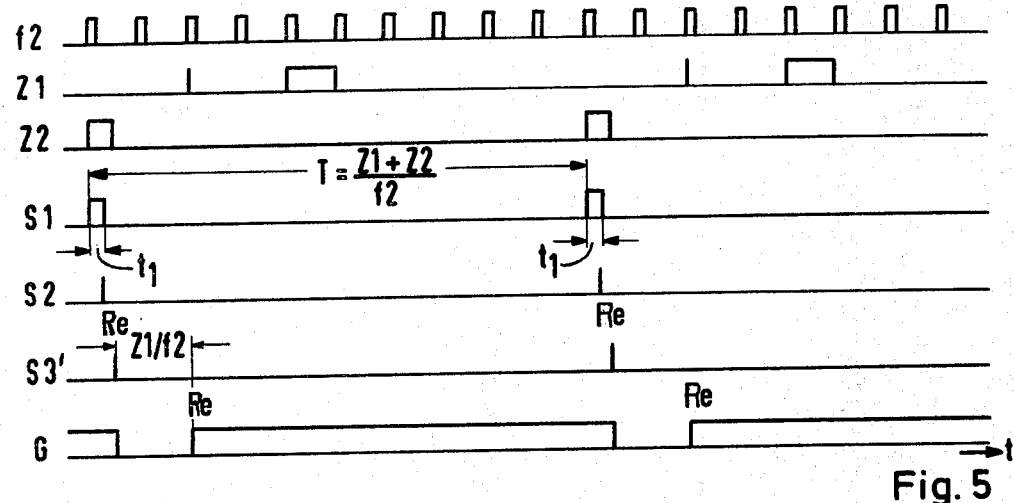
FIG. 5 is a timing diagram for the circuit of FIG. 4.

The operation of the timing circuit of FIG. 4 can best be understood with reference to the timing diagram of FIG. 5. When the most significant bit of binary counter 32 becomes a one a signal designated $Z_2$ both on FIGS. 4 and 5 will appear. This occurs after eight pulses. The signal $Z_2$ immediately results in the triggering of the monostable 34 to provide the signal S1. At the end thereof the signal S2 occurs and shortly thereafter the signal S3'. The signal S3 is either the signal S3' shown at the output of the delay means 36 or the signal G out of the flip-flop. On occurance of S3' flip-flop 38 is set. This enables AND gate 39. Thus, on a count of two, AND gate 39 will have an output, since $Z_1$ from counter 32 is present, resetting flip-flop 38. This in turn results in the signals G and S3 which resets counter 32. With flip-flop 38 reset, the count in counter 32 can reach eight before being again reset by $S_3'$. Thus between $Z_2$ outputs are 10 pulses. On the rising edge of all pulses S3 the binary counter 32 is reset to zero. This occurs at each of the points designated Re on the figure. As a result, the waveforms illustrated occur. Each time the signal S1 appears a new adjustment step $\Delta Y_n$ is added to the value $y$ and loaded into the storage means 107 to be provided to the controlled system. The time spacing betweeen steps is $T = Z_1 + Z_2 \cdot 1/f_2$ where $Z_1$ and $Z_2$ are counts in the counter when the signal Z1 and Z2 occur i.e. two and eight. Upon the occurrence of the signal S3' which appears as S3 resetting the counter 32 and storage means 101 accumulation again begins. However, upon the leading edge of the pulse G, the counter 32 and storage means 101 are reset. Thus, storage means 101 accumulates only from the beginning of the output G until the switch 18 is opened in response to the signal S1. Thus, during the period $Z_1/f_2$ the output parameter $q$ is not stored. This insures that the storing of the controlled system parameter starts only after the transient resulting from the adjustment step has died down and this parameter has again assumed a new stationary value, i.e. its new operating point.

Figure 6:
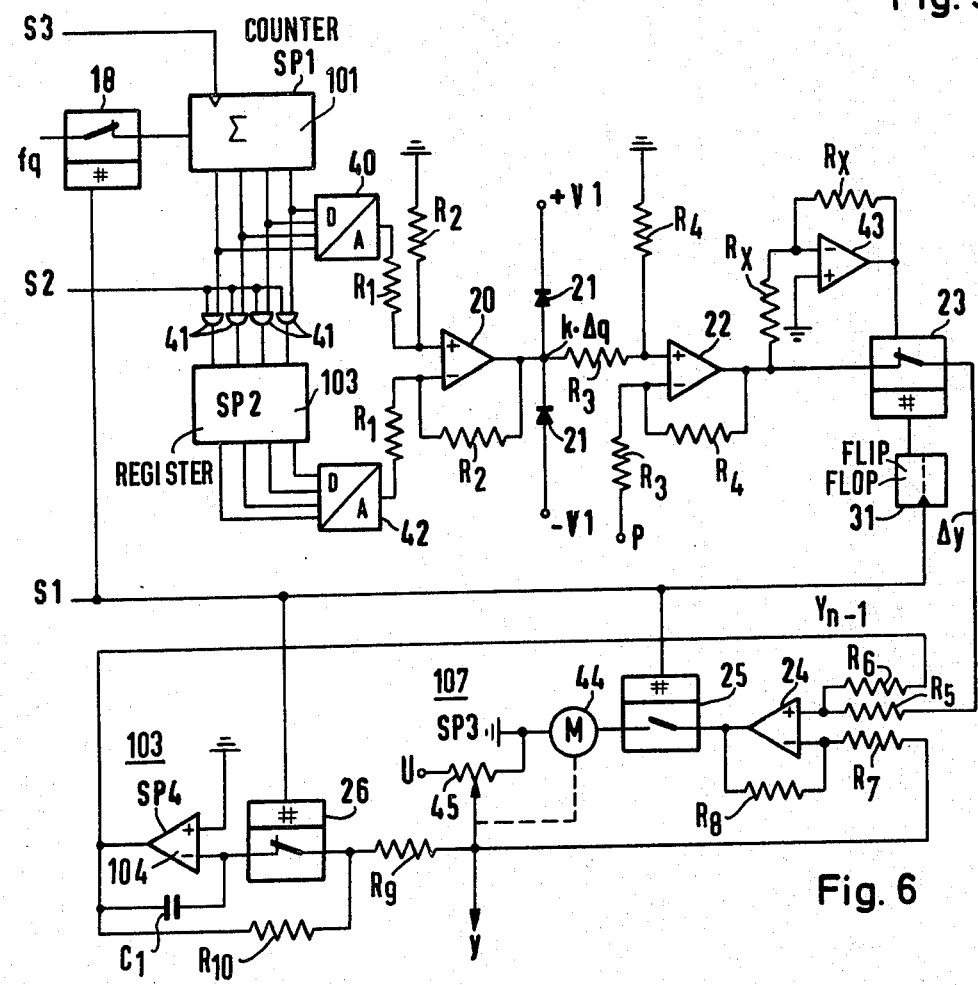
FIG. 6 is a schematic diagram illustrating the system of FIG. 3 in greater detail.

FIG. 6 illustrates an example of a circuit for implementing the system of FIG. 3. Components performing the same function as they did in FIG. 3 are given the same reference numerals. In the illustrated embodiment, the first storage means 101 is a binary counter having a reset input from the line S3. Its count input is the quantity $f_q$ from the divider 17 of FIG. 3 coupled through a switch 18 preferably a FET switch. As illustrated, the switch 18 is controlled by the signal S1. The output of the counter 101 is coupled as the input to analog to digital converter 40. It is also coupled through a plurality of AND gates 41, receiving an enabling input from the line S2, to the storage means 103 which will preferably be a storage register. The outputs of the register 103 are coupled as inputs to a second digital analog converter 42. When the signal S2 appears, the contents of counter 101 is transferred into register 103. The respective digital to analog converter outputs from the digital to analog converters 40 and 42 are coupled through conventional input resistors $R_1$ coupled respectively to the inverting and non-inverting inputs of the amplifier 20. Amplifier 20 will the predetermined gain as determined in conventional fashion by the ratio between the resistors $R_1$ and the feedback resistor $R_2$ and the ground resistor $R_2$ coupled to the non-inverting input. The output of amplifier 20 will, of course, be the voltage $\Delta q_n$ of equation (2) multiplied by $k$, the amplification factor of the amplifier. This quantity is limited by means of diodes 21 coupled between the output of the amplifier and positive and negative voltages $+V_1$ and $-V_1$ representing the predetermined value $\Delta Y_m$. This output is coupled through an input resistor $R_3$ to the non-inverting input of the amplifier 22. Coupled to the inverting input of this amplifier through another resistor $R_4$ is the fixed quantity $p$. In conventional fashion, the amplifier 22 has feedback and grounding resistors $R_4$. The result at the output of this amplifier is the difference between the two input quantities. The output of amplifier 22 is coupled through the unity gain inverting amplifier 43 having an input resistor $R_x$ and an equal feedback resistor also $R_x$ to obtain unity gain. Both the output of amplifier 22 and the output of amplifier 43 are coupled to a FET switching arrangement 23 which, in response to an input from flip-flop 31, will couple either one or the other to the output. This output, as described above, represents $\Delta y$. As noted above, flipflop 31 is triggered between its two stable states by the timing signal S1. The output of the switch means 23 is provided through an input resistor R5 to the noninverting input of a differential amplifier 24. Here it is added to the previous value $y_{n-1}$ through a second resistor R6. Thus, at the noninverting input of amplifier 24 will be the sum $y_{n-1}$ plus the step $\Delta y_n$. The output of this amplifier is coupled through the switch 25, which will also preferably be a FET switch, to a servo system including motor 44 driving a potentiometer 45. It is from the wiper of the potentiometer 45 that the controlled or regulated variable for the controlled system is obtained. It is also provided as feedback through a resistor R7 to the noninverting input of amplifier 24 which is arranged to have a predetermined gain by means of a conventional feedback resistor R8. In well known fashion, the output of the amplifier 24 will drive the motor 44 until the voltage being fed back through R7 equals the sum of the voltages on R5 and R6. In other words, the motor will be driven until the output quantity y equals the desired value. This will occur during the time period when the signal S1 of FIG. 5 is present maintaining the switch 25, preferably a FET switch, closed. When the switch is opened, the motor 44 wil remain at that position and the value of $y$ will not change further. This value of $y$ must now be transferred to the storage 103 to have available the previous value of $y_{n-1}$ for use in the next updating cycle. As described above, once the signal S1 disappears, the switch 26, again preferably a FET switch, will be closed. This causes the output from the potentiometer 45 to be coupled through input resistor R9 and switch 26 to the inverting input of an amplifier 109 having a feedback capacitor C1 and a feedback resistor R10. In well known fashion, the output of amplifier 109 will change until it reaches the input value. Then, even after the switch 26 is opened, it will hold that value making it available for summing with $\Delta y$. In other words, the circuit illustrated is a conventional sample and hold circuit.

Figure 7:
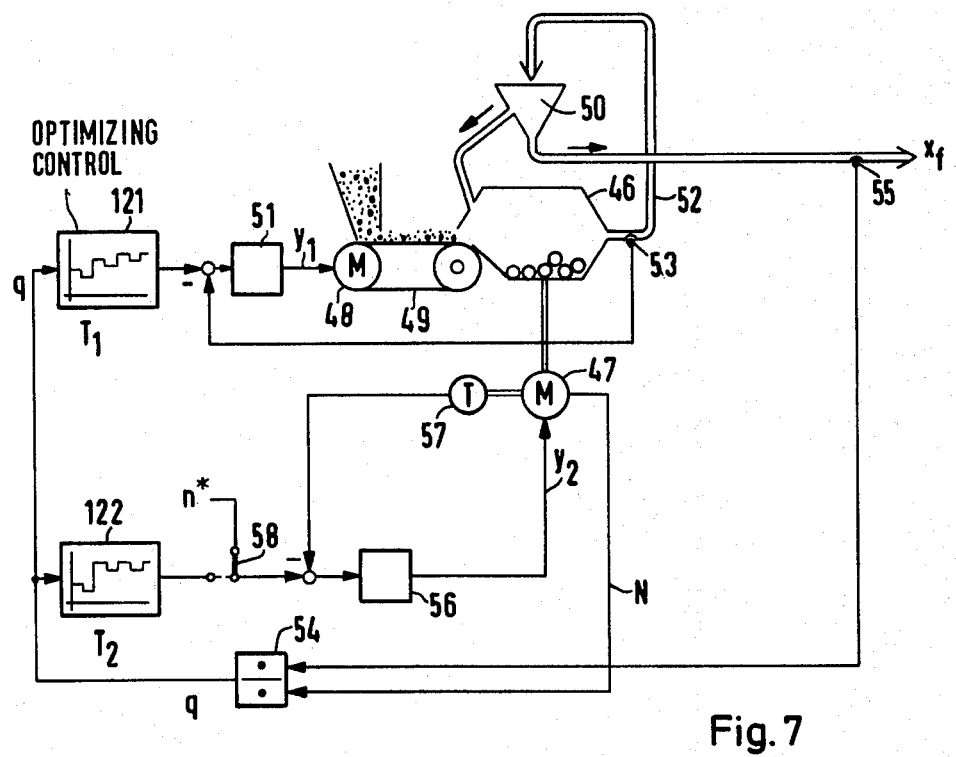
FIG. 7 is a block diagram illustrating the application of the system of the present invention to a ball mill in a cement plant.

FIG. 7 illustrates the application of the present invention to a ball mill such as that in the manufacture of cement. Such ball mills are used for milling raw material into fine powder; Since the power comsumption of such mills is considerably, any improvement in its efficiency can result in substantial cost savings.

As is well known, a ball mill consists of a rotating drum 46 which is filled up to about 20% of its volume with steel balls. The drum is rotated using a motor 47. The material to be milled is fed into the rotating drum through a hollow shaft by means of a conveyor belt 49 driven by a motor 48. The milled material is discharged at the other end of the drum. A separator 50 is used to divide it into two streams of material. One stream is material of sufficient fineness and is designated as the finished material $X_f$. The other material which is referred to as gravel is returned to the input. A controller 51 is provided to control the speed of motor 48. This will be a typical integrating type controller which compares an input describing a desired rate of flow with an actual value of rate of flow through the outlet 52, obtained from a flow meter 53, and adjusts motor speed accordingly. The reference or desired value is what is to be controlled by the system of the present invention. It is evident that if material is fed through the ball mill too fast insufficient amounts of material will be finished material and thus large amounts will have to return to the inlet. Such operation is clearly inefficient. On the other hand, if the rate at which the material is fed through the ball mill is too slow a loss in efficiency will also result. Thus, it becomes important to feed the material at a rate which will result in the maximum amount of finished material for the least power input. To accomplish this, an optimizing control 121 in accordance with the present invention, i.e. a control such as that described on FIGS. 3 and 6, is provided. A flow meter 55 is placed in the outlet line for the finished material. A power sensor is coupled to the motor 47 to provide an output quantity N proportional to the power of the mill motor 47. These two quantities are divided in a conventional analog divider to provide an ouput $q$ which is a controlled system parameter representing the quantity of finished material referred to the energy consumption of the mill motor. This is the input to the optimizing control 121 which will then provide an optimum quantity for the rate of feed.

The speed of rotation of the mill motor 47 is controlled by another conventional controller 56 receiving an actual value input from a tachometer 57 coupled to the motor and a desired input value. As shown, the desired input value can be a value N* representing a predetermined desired speed. The switch 58 can be coupled to this predetermined input or can be coupled to an additional optimizing control 122. It has been found advisable and advantageous in many cases to use such an addition optimizing control to control the speed of motor 47 in addition to controlling the rate at which material is fed into the ball mill. This results in a further optimization of the process by means of the speed of the mill drive motor 47. The design of the optimizing control 122 is identical to that described above. The only difference is that the time period T1 between which adjustment steps are carried out for the control 121 is approximately one half the period T2 between adjustment steps for the control 122. By using these different time intervals the adjustment steps provided by the two optimizing controls will not interfere with each other.

Thus, an optimizing control for optimizing a controlled system parameter has been shown. In addition its application to a ball mill has been described. Although specific embodiments and a specific application of this method and the apparatus for carrying it out have been shown and described, it will be obvious to those skilled in the art that various modifications may be made without departing from the spirit of the invention which is intended to be limited solely by the appended claims.

We claim:

1. A method for optimizing a controlled system parameter which is responsive to a regulated variable which is an input to the controlled system comprising:

a. measuring the controlled system parameter to be optimized; and
b. generating a regulated variable as an input to the controlled system by adding to the previous value of the regulated variable periodically successive adjustment steps derived from the difference, with an alternating sign, between a constant component and a component depending on the change of the control system parameter caused by the preceeding adjustment step.

2. The method according to claim 1 and further including the step of using as the component depending the on the change the lesser of the actual change and a predetermined value which is smaller than said constant adjustment step component.

3. The method according to claim 1 wherein said optimizing is carried out in a ball mill and wherein said parameter is the quantity of finished material referred to the energy consumption of the mill motor and wherein said regulated variable is the rate of admission of raw material to said ball mill.

4. The method according to claim 3 and further including providing a second regulated variable in response to said parameter, said second regulated variable being the drive speed of the mill motor.

5. The method according to claim 4 wherein the period between adjustment steps causing a change in the rate of supply of raw material is smaller by approximately one half than the period of the adjustment steps causing a change in the drive speed of the mill motor.

6. Apparatus for optimizing a controlled system parameter which changes in dependence upon a regulated variable input to the controlled system comprising:
   a. first means for storing the present value of the controlled system parameter reached as a result of an adjustment step;
   b. second means for storing the previous value of the controlled system parameter reached in a preceeding adjustment step, said second storage means being coupled to receive an updating input from said frist storage means;
   c. means for differencing the outputs of said first and second storage means;
   d. means for adding a constant signal to the output of said means for differencing;
   e. means for reversing the polarity of the output of said means for adding;
   f. control means for providing outputs at fixed time intervals for loading and clearing said first and second means for storing and for alternatively actuating said reversing means.

7. Apparatus according to claim 6 wherein said control means comprises:
   a. a clock;
   b. a first digital counter having its input coupled to the output of said clock;
   c. means for resetting said counter at a predetermined count;
   d. means for delivering in sequence a plurality of control pulses, said means being initiated by said counter reaching said predetermined count.

8. Apparatus according to claim 7 and further including second means for resetting said counter in response to reaching a second smaller count than said first predetermined count.

9. Apparatus according to claim 7 wherein said first means for storing comprises a second digital counter and said second means for storing is a register and further including means for converting said control system parameter into a signal having a frequency proportional to the magnitude of said parameter having its output coupled as an input to said second digital counter.

10. Apparatus according to claim 9 and further including first means for dividing interposed between said clock and said first digital counter and second means for dividing between said voltage to frequency converter and said second digital counter and means for simultaneously adjusting the division ratios of said first and second means for dividing in the same direction.

* * * * *